(12) United States Patent
Yokoyama et al.

(10) Patent No.: US 8,318,347 B2
(45) Date of Patent: Nov. 27, 2012

(54) LITHIUM ION SECONDARY BATTERY

(75) Inventors: Tomohiko Yokoyama, Osaka (JP); Masato Fujikawa, Osaka (JP); Hideharu Takezawa, Nara (JP); Shinji Kasamatsu, Osaka (JP)

(73) Assignee: Panasonic Corporation, Osaka (JP)

( * ) Notice: Subject to any disclaimer, the term of this patent is extended or adjusted under 35 U.S.C. 154(b) by 488 days.

(21) Appl. No.: 12/247,666

(22) Filed: Oct. 8, 2008

(65) Prior Publication Data
US 2009/0098451 A1 Apr. 16, 2009

(30) Foreign Application Priority Data

Oct. 10, 2007 (JP) .................................. 2007-264379
Sep. 9, 2008 (JP) .................................. 2008-230827

(51) Int. Cl.
- H01M 4/13 (2010.01)
- H01M 10/50 (2006.01)
- H01M 2/26 (2006.01)
- H01M 4/64 (2006.01)

(52) U.S. Cl. ......... 429/211; 429/120; 429/161; 429/233

(58) Field of Classification Search .................. 429/120, 429/231.95, 162, 218.1, 161, 211, 233
See application file for complete search history.

(56) References Cited

U.S. PATENT DOCUMENTS

| | | | | |
|---|---|---|---|---|
| 5,401,595 A | * | 3/1995 | Kagawa et al. | 429/152 |
| 5,521,024 A | * | 5/1996 | Sasaki et al. | 429/162 |
| 6,171,725 B1 | * | 1/2001 | Suzuki et al. | 429/218.1 |
| 2005/0069777 A1 | | 3/2005 | Takami et al. | |
| 2007/0072078 A1 | | 3/2007 | Hirose et al. | |

FOREIGN PATENT DOCUMENTS

| | | |
|---|---|---|
| JP | 05-159757 | 6/1993 |
| JP | 5-166550 | 7/1993 |
| JP | 9-134731 | 5/1997 |
| JP | 2002-083594 * | 3/2002 |
| JP | 2002-83594 | 3/2002 |
| JP | 2005-056655 | 3/2005 |
| JP | 2005-123183 | 5/2005 |
| JP | 2006-202552 | 8/2006 |
| JP | 2007-095563 | 4/2007 |

OTHER PUBLICATIONS

Japanese Office Action issued in Japanese Patent Application No. 2008-230827, dated Apr. 8, 2010.

* cited by examiner

*Primary Examiner* — Ula C. Ruddock
*Assistant Examiner* — Thomas H. Parsons
(74) *Attorney, Agent, or Firm* — McDermott Will & Emery LLP (57) ABSTRACT

In a lithium ion secondary battery including a flat-plate electrode assembly which is configured by stacking the positive electrode, the separator, and the negative electrode in the thickness direction thereof, each of the positive electrode and the negative electrode includes a current collector and an active material layer. Each of the current collectors includes a substantially rectangular current collector body, a heat radiating portion, and a lead portion, and the heat radiating portions are projected toward the outside of the electrode assembly so as not to overlap with each other in the thickness direction of the electrode assembly. In this way, heat caused inside the lithium ion secondary battery can be diffused efficiently to the outside, and safety of the lithium ion secondary battery can be further increased, without complicating the battery structure and decreasing mechanical strength of the battery.

7 Claims, 4 Drawing Sheets

LITHIUM ION SECONDARY BATTERY

FIELD OF THE INVENTION

The present invention relates to lithium ion secondary batteries. Further particularly, the present invention mainly relates to an improvement of a current collector.

BACKGROUND OF THE INVENTION

Lithium ion secondary batteries have high capacity and high energy density, and their size and weight reduction can be easily achieved. Therefore, lithium ion secondary batteries are widely used as a power source for portable small electronic devices, including, for example, mobile phones, personal digital assistants (PDAs), notebook personal computers, camcorders, and portable game devices. In a typical lithium ion secondary battery, a positive electrode containing a lithium cobalt compound as the positive electrode active material, a negative electrode containing a carbon material as the negative electrode active material, and a separator made of a polyolefin porous film are used. Such lithium ion secondary batteries have high battery capacity and high output, as well as excellent charge and discharge cycle performance, and relatively long durable life. However, under current situations where portable small electronic devices are becoming multi-functional and extension of continuously usable time is demanded, lithium ion secondary batteries are required to have even higher capacity.

For achieving even higher capacity lithium ion secondary batteries, for example, development of a high capacity negative electrode active material is in progress. Alloy-based negative electrode active materials that are capable of forming an alloy with lithium and reversibly absorb and desorb lithium are gaining attention as a high capacity negative electrode active material. Known alloy-based negative electrode active materials include, for example, silicon, tin, oxides of these, nitrides of these, and compounds and alloys containing these. The alloy-based negative electrode active materials have a high discharge capacity. For example, Japanese Laid-Open Patent Publication No. 2002-83594 (in the following, referred to as "Patent Document 1") mentions that silicon has a theoretical discharge capacity of about 4199 mAh/g, which is about eleven times the theoretical discharge capacity of graphite, which has been used as the negative electrode active material.

The alloy-based negative electrode active material is effective in terms of achieving a high capacity lithium ion secondary battery. However, for realizing practical use of a lithium ion secondary battery containing the alloy-based negative electrode active material, there are several problems to be solved. For example, it is very important to ensure safety of a lithium ion secondary battery containing an alloy-based negative electrode active material. Not only in lithium ion secondary batteries, in secondary batteries, heat generation may occur as a result of overcharging, an internal short circuit, inclusion of foreign matter, and the like, although in a very rare case. In a lithium ion secondary battery containing an alloy-based negative electrode active material, a large amount of heat generation may possibly occur due to the high capacity of the alloy-based negative electrode active material. Therefore, it is required that, as one safety condition, heat radiation is carried out immediately to avoid high temperature in the battery even if the heat generation occurred by some chance.

For example, there has been proposed in Japanese Laid-Open Patent Publication No. Hei 5-166500 (in the following, referred to as "Patent Document 2") a battery having a heat radiating fin. The battery in Patent Document 2 includes a wound-type electrode assembly in which a rectangular positive electrode, a solid electrolyte, and a rectangular negative electrode are piled up to form a stack, and the obtained stack is spirally wound with one short side thereof as the center. The positive electrode includes a rectangular positive electrode current collector with a heat radiating fin provided at the end of the long side thereof, and a positive electrode active material layer formed on a portion of the surface of the positive electrode current collector other than the portion where the heat radiating fin portion is provided. The negative electrode includes a rectangular negative electrode current collector with a heat radiating fin provided at the end of the long side thereof, and a negative electrode active material layer formed on a portion of the surface of the negative electrode current collector other than the portion where the heat radiating fin portion is provided. The heat radiating fin of the positive electrode current collector has through holes formed extending through the thickness or cut-out sections, and projects outwardly from one end of the wound-type electrode assembly in a spirally-wound form. The heat radiating fin of the negative electrode current collector also has through holes formed extending through the thickness or cut-out sections, and projects outwardly from the other end of the wound-type electrode assembly in a spirally-wound form.

As described above, the heat radiating fins in Patent Document 2 are in spirally wound form, and the entire heat radiating fins are positioned in close proximity; therefore, heat radiation efficiency is insufficient. Particularly, at the long side of the positive electrode current collector and the negative electrode current collector where the heat radiating fin is not provided, heat radiation efficiency declines. For example, at the long side of the positive electrode current collector where the heat radiating fin is not provided, the heat radiating fin of the negative electrode current collector is present. However, because the solid electrolyte, which does not have good thermal conductivity, is present between the positive electrode and the negative electrode, thermal conduction efficiency between the positive and negative electrodes is insufficient. Therefore, it is difficult to diffuse heat to the outside by the heat radiating fin of the negative electrode current collector at the long side of the positive electrode current collector where the heat radiating fin is not provided. Thus, it is difficult to diffuse the heat of the entire battery in a substantially uniform manner simply by providing a heat radiating fin in a spirally wound form.

Thus, in the technique of Patent Document 2, an excellent electrical conductor is connected to a projecting end portion of the heat radiating fin. However, even if such a measure is taken, heat radiation efficiency at the long side where the heat radiating fin is not provided does not sufficiently improve. Additionally, use of the excellent electrical conductor, which is an extra component for a battery, complicates the battery structure, and may possibly result in a higher defective rate in the manufacturing process and an increased production cost. Also, attachment failure may be an additional cause of heat generation.

Although Patent Document 2 describes a battery in accordance with the document as a stack-type thin battery, the battery actually made in the document is a wound-type electrode assembly; therefore, the battery of Patent Document 2 is not the stack-type battery.

There has been proposed in Japanese Laid-Open Patent Publication No. Hei 9-134731 (in the following, referred to as "Patent Document 3") a solid electrolyte battery including a rectangular flat plate electrode assembly, and a heat radiating fin (cooling fin) projecting from one of the sides of the electrode assembly toward outside of the electrode assembly. In this battery as well, the heat radiating fin is provided as an extended portion of the current collector. Also, it is implied in the document that a plurality of heat radiating fins are provided in one current collector, because the current collector is described as being projected at at least one side. However, in the configuration of Patent Document 3, a frame body includes a plurality of electrode assembly attachment apertures, and a plurality of electrode assemblies are attached to the frame body. In order to provide the plurality of heat radiating fins, many openings have to be provided in the frame body for allowing the heat radiating fins to penetrate, which result in a decrease, for example, in the mechanical strength and ability to retain the electrode assembly of the frame body. Therefore, it is technically difficult to provide a plurality of heat radiating fins in one current collector. Therefore, Patent Document 3 only discloses in detail a configuration in which one heat radiating fin is provided in one current collector.

As described above, providing only one heat radiating fin leads to poor heat radiation efficiency. Moreover, because the heat radiating fins of the electrode assemblies are disposed in close proximity in Patent Document 3, heat radiation efficiency is reduced even more. For this reason, the heat radiating fins of the electrode assemblies are disposed in close proximity and are connected electrically, but the heat radiation effect is insufficient.

BRIEF SUMMARY OF THE INVENTION

An object of the present invention is to provide a lithium ion secondary battery in which heat generating inside the battery can be diffused to the outside efficiently and safety is further improved, by a configuration that does not complicate battery structure and does not reduce mechanical strength of the battery.

The present invention relates to a lithium ion secondary battery including a flat-plate electrode assembly in which a positive electrode, a separator, and a negative electrode are stacked in the thickness direction of the flat-plate electrode assembly; and a non-aqueous electrolyte,
wherein the positive electrode and the negative electrode each include an active material layer capable of absorbing and desorbing lithium and a current collector and
said current collector includes: a substantially rectangular current collector body on the surface of which the active material layer is formed, and said current collector body being present in the flat-plate electrode assembly; and a heat radiating portion that extends from at least a portion or all of two adjacent sides of the current collector body toward the outside of the flat-plate electrode assembly.

The heat radiating portion may be formed so as to project from two opposing sides of the current collector body toward the outside of the flat-plate electrode assembly.

The heat radiating portion is preferably formed as a single unit.

The ratio ($S/S_0$) of area S of the heat radiating portion relative to area $S_0$ of the current collector body is preferably 0.03 to 1.5.

The ratio ($L/L_0$) of length L of the boundary between the current collector body and the heat radiating portion relative to peripheral length $L_0$ of the current collector body is preferably 0.25 or more.

A plane of projection of the heat radiating portion of the positive electrode current collector preferably does not overlap with a plane of projection of the heat radiating portion of the negative electrode current collector.

The negative electrode active material layer preferably contains an alloy-based negative electrode active material capable of absorbing and desorbing lithium.

The alloy-based negative electrode active material preferably contains silicon or tin.

The alloy-based negative electrode active material is preferably at least one selected from the group consisting of silicon, silicon oxides, silicon nitrides, silicon-containing alloys, silicon-containing compounds, tin, tin oxides, tin nitrides, tin-containing alloys, and tin-containing compounds.

Because heat inside a lithium ion secondary battery of the present invention battery is efficiently diffused to the outside of the battery, the battery does not reach high temperature even if heat generation is caused by, for example, overcharging, an internal short circuit, and inclusion of a foreign matter. Also, because a lithium ion secondary battery of the present invention has a very simple heat radiation mechanism, it will not suffer from an increased defective rate due to the complicated battery structure, and from a reduced mechanical strength. Therefore, a lithium ion secondary battery of the present invention is highly safe and durable.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
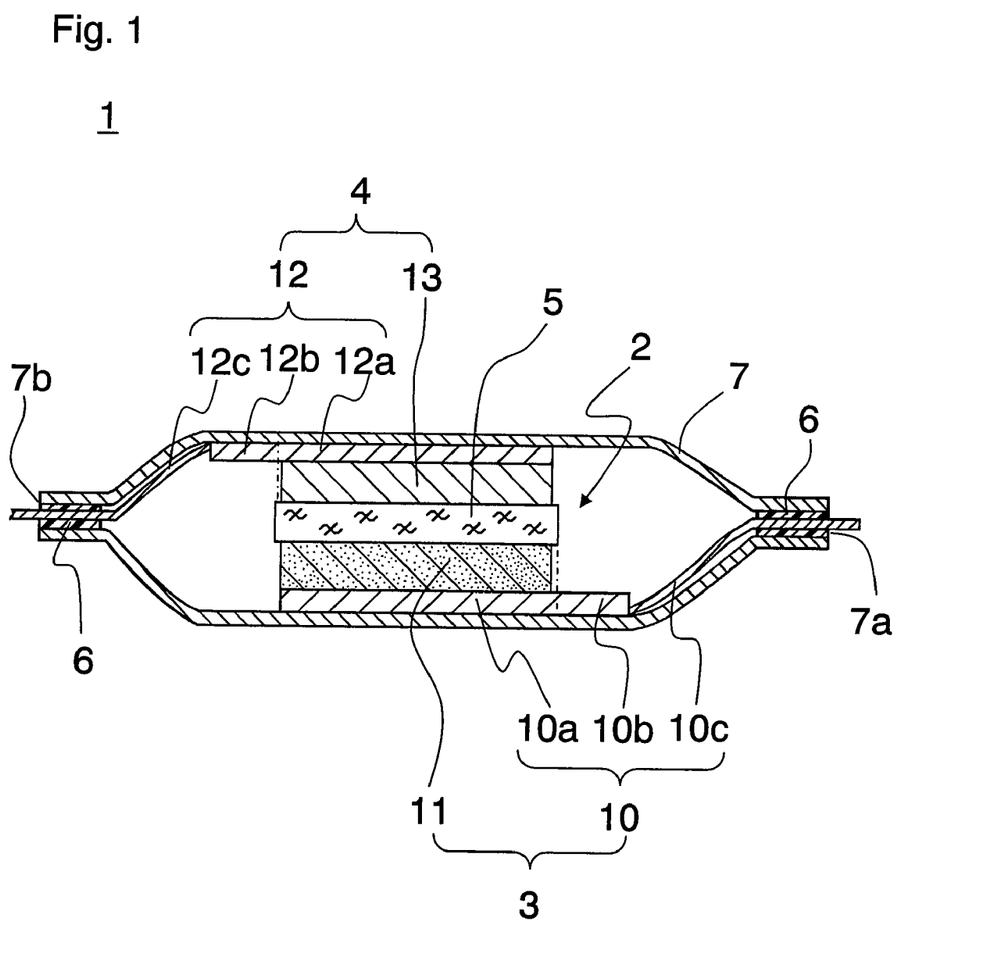
FIG. 1 is a vertical cross sectional view schematically illustrating the configuration of a lithium ion secondary battery in one embodiment of the present invention.
Figure 2:
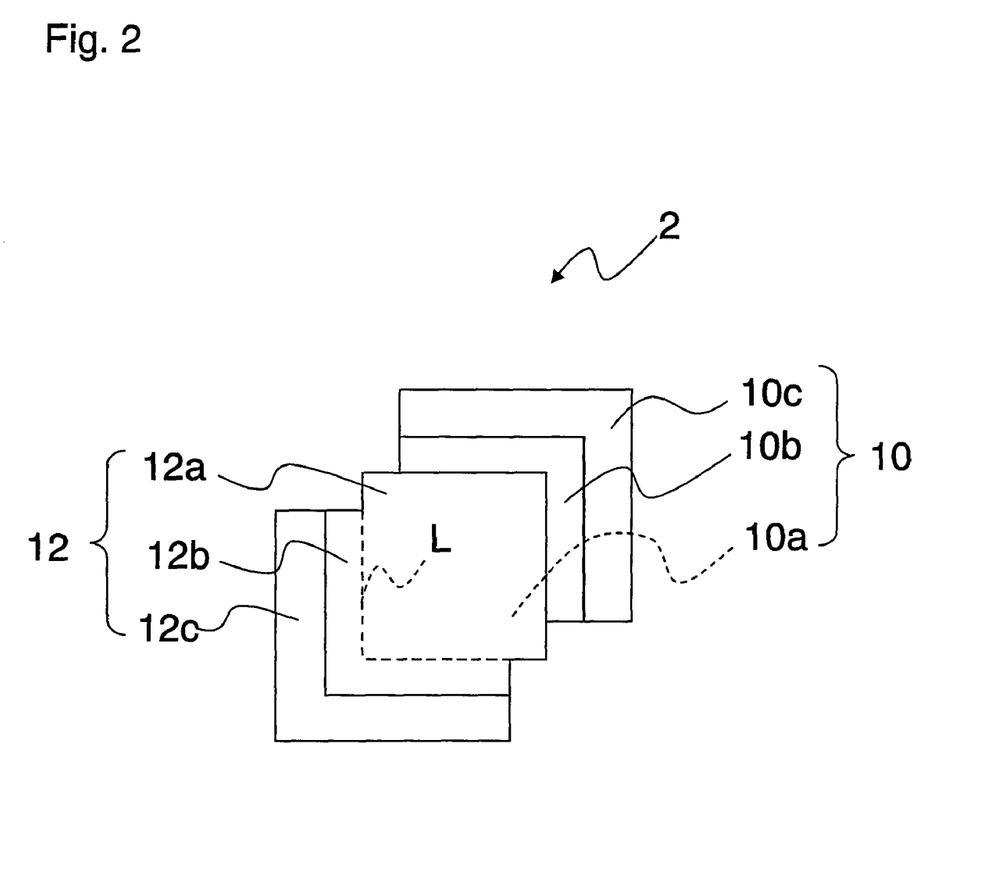
FIG. 2 is a top view schematically illustrating the configuration of a relevant part of the lithium ion secondary battery shown in FIG. 1.

FIG. 1 is a vertical cross sectional view schematically illustrating the configuration of a lithium ion secondary battery 1 in one embodiment of the present invention. FIG. 2 is a top view illustrating the configuration of an enlarged relevant part of the lithium ion secondary battery 1 shown in FIG. 1. In FIG. 2, illustration of a positive electrode active material layer 11, a negative electrode active material layer 13, and a separator 5 is omitted.

The lithium ion secondary battery 1 includes a positive electrode 3, a negative electrode 4, a separator 5, a gasket 6, and an outer case 7. The lithium ion secondary battery 1 is a stack-type battery including a flat-plate electrode assembly (in the following, referred to as "electrode assembly") 2 in which the positive electrode 3, the separator 5, and the negative electrode 4 are piled up and stacked. The electrode assembly 2 has a substantially rectangular surface in the thickness direction thereof.

The electrode assembly 2 is formed by stacking an electrode plate serving as the positive electrode 3 and an electrode plate serving as the negative electrode 4 with the separator 5 interposed therebetween so that there are a portion where the plates are overlaid and also a portion where the plates are not overlaid in the thickness direction thereof, because a heat radiating portion 10b and a heat radiating portion 12b, which will be mentioned later, are to be provided in the positive electrode 3 and the negative electrode 4, respectively. The overlaid portion corresponds to current collector bodies 10a and 12a, and the non-overlaid portion corresponds to the heat radiating portions 10b and 12b, and lead portions 10c and 12c.

The positive electrode 3 includes a positive electrode current collector 10 and a positive electrode active material layer 11.

The positive electrode current collector 10 includes a current collector body 10a, a heat radiating portion 10b, and a lead portion 10c. The positive electrode current collector 10 includes a current collector body 10a, i.e., a rectangular portion, a heat radiating portion 10b connected to the current collector body 10a, and a lead portion 10c connected to the heat radiating portion 10b. The current collector body 10a, the heat radiating portion 10b, and the lead portions 10c may be formed integrally. Also, the current collector body 10a may be integrally formed with the heat radiating portion 10b, and the lead portion 10c may be connected to the heat radiating portion 10b.

The current collector body 10a is present inside the electrode assembly 2, and the shape of its surface in the thickness direction thereof is substantially rectangular. On the surface of the current collector body 10a in the thickness direction thereof, the positive electrode active material layer 11 is formed.

The heat radiating portion 10b is an L-shaped portion formed continuously with the current collector body 10a. To be specific, the heat radiating portion 10b is provided so as to project outwardly from a portion of two adjacent sides of the current collector body 10a, toward the outside of the electrode assembly 2. In other words, the heat radiating portion 10b is formed integrally with the current collector body 10a, from a portion of the two adjacent sides of the current collector body 10a. In the thickness direction of the electrode assembly 2, the surface of the heat radiating portion 10b is provided substantially parallel to the surface of the electrode assembly 2.

By providing the heat radiating portion 10b in such a fashion, heat radiation efficiency improves and quick heat discharge is carried out even if abnormal heat generation occurs in the lithium ion secondary battery 1, preventing a temperature increase in the lithium ion secondary battery 1. In this specification, the "two adjacent sides" refer to two sides that are connected via one vertex angle in the substantially rectangular current collector body 10a. Also, in this specification, a "portion of two sides" refers to a continuous portion including respective portions of two sides and the vertex angle portion.

The heat radiating portion 10b is formed as a single unit, and its shape viewed in the thickness direction thereof is an L-shape. By forming the heat radiating portion 10b as a single unit without dividing it into a plurality of portions, the heat radiation area of the heat radiating portion 10b can be increased, and heat radiation efficiency can be further improved. Additionally, because the mechanical strength of the heat radiating portion 10b and the lithium ion secondary battery 1 is improved and the overall weight balance of the lithium ion secondary battery 1 can be equalized, long time durability of the lithium ion secondary battery 1 can be improved.

As shown in FIG. 2, in a top view illustrating the electrode assembly 2 placed on the horizontal plane with the positive electrode 3 at the bottom, the heat radiating portion 10b is provided so that no portion thereof is overlaid with the heat radiating portion 12b of the negative electrode 4, which will be mentioned later. In this way, heat radiation efficiency further improves.

The area ratio ($S/S_0$) of surface area S (in the following, referred to as "positive electrode heat radiating portion area S") of the heat radiating portion 10b relative to surface area $S_0$ (in the following, referred to as "positive electrode current collector area $S_0$") of the current collector body 10a is preferably 0.03 to 1.5, although not limited thereto. When the area ratio is below 0.03, heat radiation efficiency is reduced and heat discharge at the time of abnormal heat generation may possibly be insufficient. When the area ratio exceeds 1.5, the mechanical strength of the heat radiating portion 10b and hence that of the lithium ion secondary battery 1 decrease, which may possibly result in insufficient long time durability of the lithium ion secondary battery 1.

Positive electrode heat radiating portion area S is the surface area of one side of the heat radiating portion 10b in the thickness direction of the electrode assembly 2. Likewise, positive electrode current collector area $S_0$ is the surface area of one side of the current collector body 10a in the thickness direction of the electrode assembly 2.

Additionally, the ratio ($L/L_0$) of length L of the boundary between the current collector body 10a and the heat radiating portion 10b, relative to peripheral length $L_0$ of the current collector body 10a is preferably 0.25 or more. The boundary between the current collector body 10a and the heat radiating portion 10b is the portion indicated by the dotted line in FIG. 2, and the entire length of the dotted line portion is length L. $L_0$ is the peripheral length of the current collector body 10a, that is, a total length of the four sides of the current collector body 10a that is a rectangular portion. By setting the ratio ($L/L_0$) to 0.25 or more, heat radiation efficiency by the heat radiating portion 10b further improves. Needless to say, even if the ratio ($L/L_0$) is below 0.25, heat radiation efficiency is improved compared with batteries made by using conventional techniques.

The thickness of the heat radiating portion 10b may be set smaller than the thickness of the current collector body 10a. In this way, heat radiation efficiency can be further improved. The thickness of the heat radiating portion 10b can be selected appropriately according to the thickness of the current collector body 10a, and a range that does not cause a great degree of decrease in mechanical strength is preferably selected. The thickness of the heat radiating portion 10b can be made small by, for example, press working.

Furthermore, for example, a plurality of through holes extending through the thickness, or cut-out sections may be formed in the heat radiating portion 10b to an extent that does not damage the mechanical strength. The surface of the heat radiating portion 10b in the thickness direction thereof is insulated, for example, with a thermoplastic resin layer, which is not shown. The thermoplastic resin layer is formed using a thermoplastic resin including, for example, a modified polypropylene.

The lead portion 10c is an L-shaped portion that is formed continuously with the heat radiating portion 10b. To be more specific, the lead portion 10c is formed by a portion of two adjacent sides of the heat radiating portion 10b, so as to project outwardly from the electrode assembly 2. One end of the lead portion 10c is connected to the heat radiating portion 10b, and the other end thereof is drawn out from an opening 7a of the outer case 7 to the outside of the lithium ion secondary battery 1.

By providing the lead portion 10c in a configuration as described above, not only the lead portion 10c provides electric power to the outside of the lithium ion secondary battery 1, but also functions to release heat as an extended portion of the heat radiating portion 10b, and therefore the heat radiation effect is further increased. Particularly, because the other end of the lead portion 10c is drawn out of the lithium ion secondary battery 1, heat radiation by the lead portion 10c is carried out outside the lithium ion secondary battery 1, increasing the heat radiation effect.

The lead portion 10c may be formed of the same material as that of the current collector body 10a and the heat radiating portion 10b, or may be formed of other materials commonly used in the field of lithium ion secondary batteries. The lead portion 10c is not limited to the L-shape, and may be a thread-like lead as conventionally used.

As the positive electrode current collector 10, those commonly used in the art may be used, including, for example, a porous or non-porous conductive substrate made of a conductive resin or a metal material such as stainless steel, titanium, aluminum, an aluminum alloy, and a cladding material of aluminum and stainless steel. Examples of the porous conductive substrate include a mesh material, a net material, a punched sheet, a lath material, a porous material, a foam, and a fibrous compact (for example, nonwoven fabric). Examples of the non-porous conductive substrate include foil, a sheet, and a film. The thickness of the porous or non-porous conductive substrate is generally 1 to 500 μm, preferably 1 to 50 μm, further preferably 10 to 40 μm, and particularly preferably 10 to 30 μm, although not limited thereto. The positive electrode current collector 10 is obtained, for example, by punching out such conductive substrates into a predetermined shape.

The positive electrode active material layer 11 is provided on one side or both sides in the thickness direction of the current collector body 10a in the positive electrode current collector 10, and includes a positive electrode active material. The positive electrode active material layer 11 may include a conductive agent and a binder along with the positive electrode active material.

The positive electrode active material is not particularly limited, as long as it is capable of absorbing and desorbing lithium ions. For example, lithium-containing composite metal oxides, and olivine-type lithium phosphate may be used preferably. A lithium-containing composite metal oxide is a metal oxide containing lithium and a transition metal, or a metal oxide in which a transition metal in such a metal oxide is partially replaced with a different element. Examples of the different element include Na, Mg, Sc, Y, Mn, Fe, Co, Ni, Cu, Zn, Al, Cr, Pb, Sb, and B. Among these, Mn, Al, Co, Ni, and Mg are preferable. The different element may be used singly, or two or more different elements may be used.

Specific examples of the lithium-containing composite metal oxides include $Li_lCoO_2$, $Li_lNiO_2$, $Li_lMnO_2$, $Li_lCo_mNi_{1-m}O_2$, $Li_lCo_mM_{1-m}O_n$, $Li_lNi_{1-m}M_mO_n$, $Li_lMn_2O_4$, $Li_lMn_{2-m}M_mO_4$, $LiMPO_4$, and $Li_2MPO_4F$ (where M represents at least one element selected from the group consisting of Na, Mg, Sc, Y, Mn, Fe, Co, Ni, Cu, Zn, Al, Cr, Pb, Sb, and B. l=0 to 1.2, m=0 to 0.9, n=2.0 to 2.3.).

The value "m" representing the molar ratio of lithium is a value immediately after the preparation of the positive electrode active material, and increases or decreases due to charge and discharge. Among these, lithium-containing composite metal oxides represented by general formula $Li_lCo_mM_{1-m}O_n$ (where M, l, m, and n are as defined above.) are preferable.

The lithium-containing composite metal oxides may be made by a known method. For example, a lithium-containing composite metal oxide can be obtained by preparing a composite metal hydroxide containing metal other than lithium by coprecipitation using an alkaline agent such as sodium hydroxide, and heat-treating this composite metal hydroxide to obtain a composite metal oxide, adding a lithium compound such as lithium hydroxide, to the composite metal oxide, followed by further heat treatment.

Specific examples of the olivine-type lithium phosphate include $LiXPO_4$ (where X is at least one selected from the group consisting of Co, Ni, Mn, and Fe).

One type of the positive electrode active material may be used singly, or two or more types of the positive electrode active material may be used in combination as necessary.

As the conductive agent, those commonly used in the field of lithium ion secondary batteries may be used, including, for example, graphites such as natural graphite and artificial graphite; carbon blacks such as acetylene black, ketjen black, channel black, furnace black, lamp black, and thermal black; conductive fibers such as carbon fiber and metal fiber; fluorocarbon; powders of metal such as aluminum; conductive whiskers such as zinc oxide and potassium titanate; conductive metal oxides such as titanium oxide; and organic conductive materials such as phenylene derivatives. One type of conductive agent may be used singly, or two or more types of conductive materials may be used in combination as necessary.

As the binder also, those commonly used in the field of lithium ion secondary batteries may be used, including, for example, polyvinylidene fluoride (PVDF), polytetrafluoroethylene, polyethylene, polypropylene, aramid resin, polyamide, polyimide, polyamide-imide, polyacrylnitrile, polyacrylic acid, polymethyl acrylate, polyethyl acrylate, polyhexyl acrylate, polymethacrylic acid, polymethyl methacrylate, polyethyl methacrylate, polyhexyl methacrylate acid, polyvinyl acetate, polyvinylpyrrolidone, polyether, polyether sulphone, hexafluoropolypropylene, styrene-butadiene rubber, modified acrylic rubber, and carboxymethyl cellulose.

A copolymer containing two or more monomer compounds may also be used as the binder. Examples of the monomer compound include tetrafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid, and hexadiene. One type of binder may be used singly, or two or more types of binders may be used in combination as necessary.

The positive electrode active material layer 11 may be formed, for example, by applying a positive electrode material mixture slurry onto the surface of the positive electrode current collector 10 (current collector body 10a), drying, and rolling. The positive electrode material mixture slurry can be prepared by dissolving or dispersing, in an organic solvent, a positive electrode active material, and as necessary a conductive agent and a binder, for example. As the organic solvent, for example, dimethylformamide, dimethylacetamide, methylformamide, N-methyl-2-pyrrolidone (NMP), dimethylamine, acetone, and cyclohexanone may be used. For the preparation of the positive electrode material mixture slurry, any of a common mixer or disperser that mixes powder and liquid may be used.

When the positive electrode material mixture slurry contains the positive electrode active material, the conductive agent, and the binder, the proportion of these three components are not particularly limited. Preferably, the amounts of these three components used are appropriately selected such that the amount of the positive electrode active material is in the range of 80 to 98 wt %, the amount of the conductive agent is in the range of 1 to 10 wt %, and the amount of the binder is in the range of 1 to 10 wt %, relative to 100 wt % of the total amount of these three components.

The thickness of the positive electrode active material layer 11 may be appropriately selected according to various conditions, including, for example, designed performance and use of the lithium ion secondary battery 1 to be obtained. For example, when the positive electrode active material layer 11 is provided on both sides of the positive electrode current collector 10, the total thickness of the positive electrode active material layer 11 is preferably about 50 to 100 μm.

The negative electrode 4 includes a negative electrode current collector 12 and a negative electrode active material layer 13.

The negative electrode current collector 12 includes a current collector body 12a, a heat radiating portion 12b, and a lead portion 12c. The negative electrode current collector 12 has the same shape as that of the positive electrode current collector 10. The positive electrode current collector 10 and the negative electrode current collector 12 are disposed so that their point of intersections of diagonal lines of the current collector bodies 10a and 12a coincide in the thickness direction thereof, and that they are symmetrical with respect to the point of intersection.

The current collector body 12a is present inside the electrode assembly 2; is positioned at substantially the same position as that of the current collector body 10a of the positive electrode current collector 10 in the thickness direction of the electrode assembly 2; and has substantially the same rectangular shape. On one side or both sides of the surface of the current collector body 12a in the thickness direction thereof, a negative electrode active material layer 13 is formed.

The heat radiating portion 12b is formed continuously with the current collector body 12a. To be more specific, the heat radiating portion 12b is provided so as to project outwardly from a portion of two adjacent sides of the current collector body 12a toward the outside of the electrode assembly 2 at the opposite side from the heat radiating portion 10b of the positive electrode current collector 10. In other words, the heat radiating portion 12b is formed as a single unit from a portion of two adjacent sides of the current collector body 12a. In the thickness direction of the electrode assembly 2, the surface of the heat radiating portion 12b is provided substantially parallel to the surface of the electrode assembly 2. The effects of providing the heat radiating portion 12b are the same as the effects of providing the heat radiating portion 10b.

The heat radiating portion 12b is formed as a single unit, and its shape in the thickness direction thereof is an L-shape. The heat radiating portion 12b is in symmetrical relation with the heat radiating portion 10b with respect to the point of intersection of the diagonal lines of the current collector body 12a. The effect of providing the heat radiating portion 12b as a single unit, rather than dividing it into a plurality of parts are also the same as the effect of providing the heat radiating portion 10b as a single unit.

As shown in FIG. 2, the heat radiating portion 12b is provided so that when the electrode assembly 2 is placed on the horizontal plane with the positive electrode 3 at its bottom, a plane of projection of the electrode assembly 2 as viewed from vertically (in the following, referred to as "plane of projection") does not overlap with a plane of projection of the heat radiating portion 10b of the positive electrode 3. In this way, possibility of decline in heat radiation efficiency is minimized.

The area ratio ($S/S_0$) of surface area S (in the following, referred to as "negative electrode heat radiating portion area S") of the heat radiating portion 12b relative to surface area $S_0$ (in the following, referred to as "negative electrode current collector area $S_0$") of the current collector body 12a is preferably 0.03 to 1.5, although it is not particularly limited thereto. When the area ratio is below 0.03, heat radiation efficiency is reduced and heat discharge at the time of abnormal heat generation may possibly be insufficient. When the area ratio exceeds 1.5, the mechanical strength of the heat radiating portion 12b and hence that of the lithium ion secondary battery 1 decrease, which may possibly result in insufficient long time durability of the lithium ion secondary battery 1.

Negative electrode heat radiating portion area S is the surface area of one side of the heat radiating portion 12b in the thickness direction of the electrode assembly 2. Likewise, negative electrode current collector area $S_0$ is the surface area of one side of the current collector body 12a in the thickness direction of the electrode assembly 2.

Additionally, the ratio ($L/L_0$) of length L of the boundary between the current collector body 12a and the heat radiating portion 12b, relative to peripheral length $L_0$ of the current collector body 12a is preferably 0.25 or more. The boundary between the current collector body 12a and the heat radiating portion 12b corresponds to the dotted line in the positive electrode current collector 10 shown in FIG. 2.

In this embodiment, the negative electrode current collector 12 and the positive electrode current collector 10 have the same shape, and the current collector bodies 10a and 12a also have the same shape. Therefore, the boundary between the current collector body 12a and the heat radiating portion 12b has the same length as that of the dotted line portion in the positive electrode current collector 10. The entire length of this dotted line is length L. $L_0$ is the peripheral length of the current collector body 12a, that is, a total of the four sides of the current collector body 12a that is a rectangular portion. By setting ratio ($L/L_0$) to 0.25 or more, heat radiation efficiency of the heat radiating portion 12b further improves. It goes without saying that heat radiation efficiency is improved compared with batteries made by using conventional techniques even if ratio ($L/L_0$) is below 0.25.

The thickness of the heat radiating portion 12b may be set smaller than the thickness of the current collector body 12a. The effects thereof are the same as the effects obtained by setting the thickness of the heat radiating portion 10b to smaller than the thickness of the current collector body 10a. The thickness of the heat radiating portion 12b can be selected appropriately according to the thickness of the current collector body 12a, and a range that does not cause a great degree of decrease in mechanical strength is preferably selected. In order to make the thickness of the heat radiating portion 12b small, for example, press working may be used.

Furthermore, for example, a plurality of through holes extending through the thickness, or cut-out sections may be formed in the heat radiating portion 12b, to an extent that does not damage the mechanical strength. The surface of the heat radiating portion 12b in the thickness direction thereof is insulated, for example, with a thermoplastic resin layer, which is not shown. The thermoplastic resin layer is formed by using a thermoplastic resin including, for example, modified polypropylene.

The lead portion 12c is an L-shaped portion that is formed continuously with the heat radiating portion 12b. To be more specific, the lead portion 12c is formed by a portion of two adjacent sides of the heat radiating portion 12b, so as to project outwardly from the electrode assembly 2. One end of the lead portion 12c is connected to the heat radiating portion 12b, and the other end thereof is drawn out from an opening 7a of the outer case 7 to the outside of the lithium ion secondary battery 1.

By providing the lead portions 12c in a configuration as described above, not only the lead portion 12c provides electric power to the outside of the lithium ion secondary battery 1, but also functions to release heat as an extended portion of the heat radiating portion 12b. Particularly, because the other end of the lead portion 12c is drawn out of the lithium ion secondary battery 1, heat radiation by the lead portion 12c is carried out outside the lithium ion secondary battery 1. Therefore, the heat radiation effect is further increased. The lead portions 12c may be formed of the same material as that of the current collector body 12a and the heat radiating portion 12b, or may be formed of other materials commonly used in the field of lithium ion secondary batteries. The lead portion 12c is not limited to the L-shape, and may be a thread-like lead as conventionally used.

As the negative electrode current collector 12, those commonly used in the field of lithium ion secondary batteries may be used, including, for example, a porous or non-porous conductive substrate made of a conductive resin or a metal material such as stainless steel, titanium, nickel, aluminum, copper, a copper alloy, a cladding material of copper and nickel, and nickel-plated copper. Examples of the porous conductive substrate include a mesh material, a net material, a punched sheet, a lath material, a porous material, a foam, and a fibrous compact (for example, nonwoven fabric). Examples of the non-porous conductive substrate include foil, a sheet, and a film. The thickness of the porous or non-porous conductive substrate is generally 1 to 500 μm, preferably 1 to 50 μm, further preferably 10 to 40 μm, particularly preferably 10 to 30 μm, although not limited thereto. The negative electrode current collector 12 is obtained, for example, by punching out these conductive substrates into a predetermined shape.

The negative electrode active material layer 13 includes an alloy-based negative electrode active material, and formed, as a thin film, on one side or both sides of the current collector body 12a in the thickness direction thereof. The negative electrode active material layer 13 may be formed of, for example, an alloy-based negative electrode active material and a minute amount of impurities that are contained inevitably. The negative electrode active material layer 13 may also include, along with the alloy-based negative electrode active material, a known negative electrode active material and an additive, to the extent that will not damage its performance. Furthermore, the negative electrode active material layer 13 is preferably an amorphous or a low crystalline thin film containing an alloy-based negative electrode active material and having a thickness of 3 to 50 μm.

The alloy-based negative electrode active material is a negative electrode active material that absorbs lithium by being alloyed with lithium during charge, and desorbs lithium during discharge under a negative electrode potential. A known alloy-based negative electrode active material may be used, including, for example, a silicon-containing compound and a tin-containing compound, although it is not particularly limited thereto.

Examples of the silicon-containing compound include silicon, silicon oxides, silicon carbide, silicon nitrides, silicon-containing alloys, silicon compounds, and solid solutions thereof. The silicon oxides include, for example, silicon oxide represented by the composition formula: $SiO_a$ ($0.05 < a < 1.95$). The silicon carbides include, for example, silicon carbide represented by the composition formula: $SiC_\beta$ ($0 < \beta < 1$). The silicon nitride includes, for example, silicon nitride represented by the composition formula: $SiN_\gamma$ ($0 < \gamma < 4/3$).

The silicon-containing alloys include, for example, an alloy containing silicon and one or more element selected from the group consisting of Fe, Co, Sb, Bi, Pb, Ni, Cu, Zn, Ge, In, Sn, and Ti. The silicon compounds include, for example, a compound in which a part of silicon included in silicon, a silicon oxide, a silicon nitride, and a silicon-containing alloy is replaced with one or more element selected from the group consisting of B, Mg, Ni, Ti, Mo, Co, Ca, Cr, Cu, Fe, Mn, Nb, Ta, V, W, Zn, C, N, and Sn. Among these, silicon, and a silicon oxide are particularly preferable.

The tin-containing compounds include, for example, tin, a tin oxide, a tin nitride, a tin-containing alloy, a tin compound, and a solid solution thereof. As the tin-containing compound, for example, tin, a tin oxide such as $SnO_\delta$ ($0 < \delta < 2$), and $SnO_2$; a tin-containing alloy such as a Ni—Sn alloy, a Mg—Sn alloy, a Fe—Sn alloy, a Cu—Sn alloy, and a Ti—Sn alloy; and a tin compound such as $SnSiO_3$, $Ni_2Sn_4$, and $Mg_2Sn$ may be used preferably. Among these, tin and a tin oxide such as $SnO_\beta$ ($0 < \beta < 2$) and $SnO_2$ are particularly preferable. One type of the silicon-containing compounds or of the tin-containing compounds may be used singly, or these may be used in combination.

The negative electrode active material layer 13 may be formed, for example, on the surface of the negative electrode current collector 12 based on a known thin film forming method. The thin film forming method includes, for example, sputtering, a deposition method, and a chemical vapor deposition method (CVD). Among these, the deposition method is preferable.

The separator 5 is disposed between the positive electrode 3 and the negative electrode 4. For the separator 5, a sheet material or a film material having predetermined ion permeability, mechanical strength, and nonconductivity is used. Specific examples of the separator 5 include a porous sheet or film material such as a microporous film, a woven fabric, and a nonwoven fabric. The microporous film may be any of a single-layer film and a multi-layer film (composite film). The single-layer film is made of one material. The multi-layer film (composite film) is a stack of a single-layer film made of one material, or a stack of single-layer films made of different materials.

Although various resin materials may be used for the materials of the separator 5, in view of durability, shutdown function, and battery safety, polyolefins such as polyethylene and polypropylene are preferable. The shutdown function is the function of closing the through holes at the time of battery abnormal heat generation, thereby inhibiting ion permeation, and shutting down the battery reaction. As necessary, the separator 5 may be formed by two or more stacks of, for example, the microporous film, the woven fabric, or the nonwoven fabric.

Although the thickness of the separator 5 is generally 10 to 300 μm, preferably, the thickness is 10 to 40 μm, further preferably 10 to 30 μm, and still further preferably 10 to 25 μm. The porosity of the separator 5 is preferably 30 to 70%, and further preferably 35 to 60%. The porosity is the ratio of the total volume of pores present in the separator 5 relative to the volume of the separator 5.

The separator 5 is impregnated with an electrolyte having lithium ion conductivity. The electrolyte having the lithium ion conductivity is preferably a non-aqueous electrolyte having lithium ion conductivity. Examples of the non-aqueous electrolyte include a liquid non-aqueous electrolyte, a gelled non-aqueous electrolyte, and a solid electrolyte (for example, polymer solid electrolyte).

The liquid non-aqueous electrolyte contains a solute (supporting salt) and a non-aqueous solvent, and as necessary, further contains various additives. The solute is generally dissolved in the non-aqueous solvent. For example, the separator is impregnated with, for example, a liquid non-aqueous electrolyte.

As the solute, those commonly used in the art may be used, including, for example, $LiClO_4$, $LiBF_4$, $LiPF_6$, $LiAlCl_4$, $LiSbF_6$, LISCN, $LiCF_3SO_3$, $LiCF_3CO_2$, $LiAsF_6$, $LiB_{10}Cl_{10}$, lithium lower aliphatic carboxylate, LiCl, LiBr, LiI, $LiBCl_4$, borates, imide salts and the like.

Examples of the borates include bis(1,2-benzenedioleate (2-)-O,O')lithium borate, bis(2,3-naphthalenedioleate(2-)-O, O')lithium borate, bis(2,2'-biphenyldioleate(2-)-O,O') lithium borate, bis(5-fluoro-2-olate-1-benzenesulfonic acid-O,O')lithium borate and the like.

Examples of the imide salts include bistrifluoromethane sulfonic acid imide lithium (($CF_3SO_2)_2$NLi), trifluoromethanesulfonic acid nonafluorobutane sulfonic acid imide lithium (($CF_3SO_2)(C_4F_9SO_2$)NLi), bispentafluoroethanesulfonic acid imide lithium (($C_2F_5SO_2)_2$NLi) and the like. One of the solutes may be used singly or, as necessary, two or more of the solutes may be used in combination. The amount of the solute to be dissolved in the non-aqueous solvent is preferably in the range of 0.5 to 2 mol/L.

As the non-aqueous solvent, those commonly used in the art may be used, including, for example, cyclic carbonates, chain carbonates, and cyclic carboxylates. Examples of the cyclic carbonates include propylene carbonate (PC), ethylene carbonate (EC) and the like. Examples of the chain carbonates include diethyl carbonate (DEC), ethyl methyl carbonate (EMC), dimethyl carbonate (DMC) and the like. Examples of the cyclic carboxylate includes, γ-butyrolactone (GBL), γ-valerolactone (GVL) and the like. One of the non-aqueous solvents may be used singly, or as necessary, two or more of them may be used in combination.

Examples of the additive include a material that improves charge and discharge efficiency and a material that makes a battery inactive. The material that improves charge and discharge efficiency improves the charge and discharge efficiency by, for example, decomposing on the negative electrode to form a coating with high lithium ion conductivity. Specific examples of such materials include vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinyl ethylene carbonate (VEC), divinyl ethylene carbonate and the like. These may be used singly, or may be used in combination of two or more. Among these, at least one selected from the group consisting of vinylene carbonate, vinyl ethylene carbonate, and divinyl ethylene carbonate is preferable. In the above-described compounds, the hydrogen atoms may be partially replaced with fluorine atoms.

The material that makes a battery inactive makes a battery inactive by, for example, decomposing at the time of battery overcharge, to form a coating on the surface of the electrode. Examples of such materials include benzene derivatives. The benzene derivative includes, a benzene compound containing a phenyl group and a cyclic compound group adjacent to the phenyl group. For the cyclic compound group, for example, a phenyl group, a cyclic ether group, a cyclic ester group, a cycloalkyl group, and a phenoxy group are preferable. Specific examples of the benzene derivatives include cyclohexyl benzene, biphenyl, diphenylether and the like. The benzene derivatives may be used singly, or may be used in combination of two or more. However, the benzene derivative content in the liquid non-aqueous electrolyte is preferably 10 parts by volume or less relative to 100 parts of volume of the non-aqueous solvent.

The gelled non-aqueous electrolyte includes a liquid non-aqueous electrolyte and a polymer material for holding the liquid non-aqueous electrolyte. Here, the polymer material used is a material that is capable of gelling a liquid. As the polymer material, those commonly used in the art may be used including, for example, polyvinylidene fluoride, polyacrylonitrile, polyethylene oxide, polyvinyl chloride, polyacrylate, polyvinylidene fluoride and the like.

The solid electrolyte includes, for example, a solute (supporting salt) and a polymer material. As the solute, those previously-described as examples may be used. Examples of the polymer material include polyethylene oxide (PEO), polypropylene oxide (PPO), and a copolymer of ethylene oxide and propylene oxide.

The gasket 6 is used to seal the openings 7a and 7b of the outer case 7. As the gasket 6, for example, various resin materials, or various rubber materials may be used. As the outer case 7 as well, any of those commonly used in the field of lithium ion secondary batteries are used. The openings 7a and 7b of the outer case 7 may be sealed directly by welding, without using the gasket 6.

The lithium ion secondary battery 1 may be made, for example, as follows. First, the positive electrode 3 and the negative electrode 4 are stacked with the separator 5 interposed therebetween to make an electrode assembly 2. At this time, the positive electrode 3 and the negative electrode 4 are disposed so that the positive electrode active material layer 11 and the negative electrode active material layer 13 face each other. This electrode assembly 2 is inserted into the outer case 7, and free ends of the positive electrode lead portion 10c and the negative electrode lead portion 12c are drawn out from the openings 7a and 7b to the outside of the outer case 7. Then, the non-aqueous electrolyte is injected in the outer case 7, and openings 7a and 7b are welded with the gasket 6 interposed therebetween, while decreasing the internal pressure of the outer case 7 under vacuum. The lithium ion secondary battery 1 is thus obtained.

Figure 3:
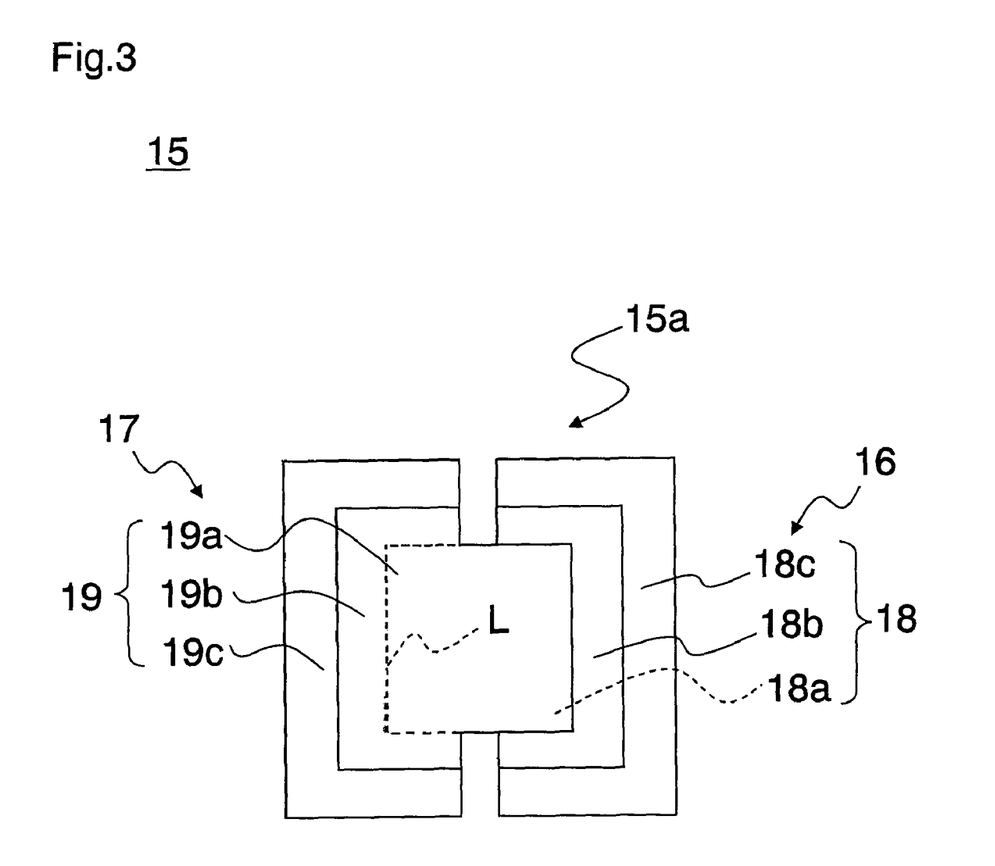
FIG. 3 is a top view schematically illustrating the configuration of a relevant part of a lithium ion secondary battery in another embodiment of the present invention.

FIG. 3 is a top view schematically illustrating the configuration of a relevant part (electrode assembly 15a) of a lithium ion secondary battery 15 in another embodiment of the present invention. FIG. 3 is a top view of the electrode assembly 15a on the horizontal plane so as to bring the side of the positive electrode 16 in contact with the horizontal plane, seen from vertically above to that horizontal plane. The lithium ion secondary battery 15 is similar to the lithium ion secondary battery 1, and illustration and descriptions of corresponding components are omitted. The lithium ion secondary battery 15 has the same configuration as that of the lithium ion secondary battery 1, except that an electrode assembly 15a is included instead of the electrode assembly 2.

The electrode assembly 15a is a flat-plate electrode assembly in which the positive electrode 16, a separator (not shown), and the negative electrode 17 are stacked.

The positive electrode 16 includes a positive electrode current collector 18 and a positive electrode active material layer, which is not shown.

The positive electrode current collector 18 includes a current collector body 18a, a heat radiating portion 18b, and a lead portion 18c. The current collector body 18a has the same configuration as that of the current collector body 10a, and has a substantially rectangular shape. The heat radiating portion 18b is continuous with the current collector body 18a, and is provided on the surface of the electrode assembly 15a so as to be substantially parallel to the thickness direction thereof. The heat radiating portion 18b has the same configuration as that of the heat radiating portion 10b, except that it has an angular U-shape, open to the left in FIG. 3. The shape of the heat radiating portion 18b is the shape of the surface in the thickness direction of the electrode assembly 15a.

The heat radiating portion 18b formed as a single unit, extending toward the outside of the electrode assembly 15a from one side of the current collector body 18a and a portion of two other sides of the current collector body 18a that are adjacent to and sharing the vertex angles with the aforementioned one side. That is, the heat radiating portion 18b is provided so as to extend from three sides of the current collector body 18a toward the outside of the electrode assembly 15a. With such a configuration, the heat radiation efficiency of the heat radiating portion 18b becomes even higher than the heat radiation efficiency of the heat radiating portion 10b.

The lead portion 18c is continuous with the heat radiating portion 18b, and is provided so as to be substantially parallel to the surface of the electrode assembly 15a in the thickness direction thereof. The lead portion 18c has the same configuration as that of the lead portion 10c, except that it has an angular U-shape, open to the left in FIG. 3. The shape of the lead portion 18c is the shape of the surface of the electrode assembly 15a in the thickness direction thereof. The lead portion 18c is formed as a single unit, extending toward the outside of the electrode assembly 15a from one of the sides and also from a portion of two other sides that are adjacent and sharing the vertex angles with the aforementioned one of sides in the periphery of the heat radiating portion 18b.

That is, the lead portion 18c is provided so as to extend from three sides of the heat radiating portion 18b toward the outside of the electrode assembly 15a. The lead portion 18c has the same configuration as that of the lead portion 10c, except for its shape. With such a configuration, the heat radiation effects of the heat radiating portion 18b can be made even higher.

The positive electrode active material layer has the same configuration as that of the positive electrode active material layer 11 in the lithium ion secondary battery 1.

The negative electrode 17 includes a negative electrode current collector 19 and a negative electrode active material layer, which is not shown.

The negative electrode current collector 19 includes a current collector body 19a, a heat radiating portion 19b, and a lead portion 19c, and has the same shape as that of the positive electrode current collector 18. The current collector body 19a has the same configuration as that of the current collector body 12a, and has a substantially rectangular shape. The heat radiating portion 19b is continuous with the current collector body 18a, and is provided so as to be parallel to the surface of the electrode assembly 15a in the thickness direction thereof. The heat radiating portion 19b has the same configuration with the heat radiating portion 12b, except that it has an angular U-shape, open to the right in FIG. 3. The shape of the heat radiating portion 19b is the shape of the surface in the thickness direction of the electrode assembly 15a.

The heat radiating portion 19b is formed as a single unit, extending toward the outside of the electrode assembly 15a from one side of the current collector body 19a and a portion of two other sides of the current collector body 19a that are adjacent to and sharing the vertex angles with the aforementioned one side. That is, the heat radiating portion 19b is provided so as to extend from three sides of the current collector body 19a toward the outside of the electrode assembly 15a. With such a configuration, the heat radiation efficiency of the heat radiating portion 19b becomes even higher than the heat radiation efficiency of the heat radiating portion 12b.

The lead portion 19c is continuous with the heat radiating portion 19b, and is provided so as to be substantially parallel to the surface of the electrode assembly 15a in the thickness direction thereof. The lead portion 19c has an angular U-shape, open to the right in FIG. 3, and has the same configuration as that of the lead portion 18c. The shape of the lead portion 19c is the shape of the surface in the thickness direction of the electrode assembly 15a. The lead portion 19c is formed as a single unit, extending toward the outside of the electrode assembly 15a from one of the sides and also from a portion of two other sides that are adjacent to and sharing the vertex angles with the aforementioned one of sides in the periphery of the heat radiating portion 19b. That is, the lead portion 19c is provided so as to extend from three sides of the heat radiating portion 19b toward the outside of the electrode assembly 15a. With such a configuration, the heat radiation effects of the heat radiating portion 19b can be made even higher.

The negative electrode active material layer has the same configuration as that of the negative electrode active material layer 13 in the lithium ion secondary battery 1.

As shown in FIG. 3, in the lithium ion secondary battery 15 as well, the positive electrode current collector 18 and the negative electrode current collector 19 are disposed so that the point of intersections of diagonal lines of their current collector bodies 18a and 19a coincide with each other in the thickness direction thereof. That is, the current collector bodies 18a and 19a are overlaid in the thickness direction, with the positive electrode active material layer, the separator, and the negative electrode active material layer interposed therebetween. Also, the positive electrode current collector 18 and the negative electrode current collector 19 are symmetrically disposed with the point of intersection of the diagonal lines of the current collector bodies 18a and 19a, so that plane of projections of the heat radiating portions 18b and 19b are not overlaid in the thickness direction thereof.

The lithium ion secondary battery 15 includes the electrode assembly 15a with the above-described heat radiating portions 18b and 19b, and therefore the heat radiation efficiency further improves, the mechanical strength improves, and durability particularly in view of distortive deformation becomes even higher.

Figure 4:
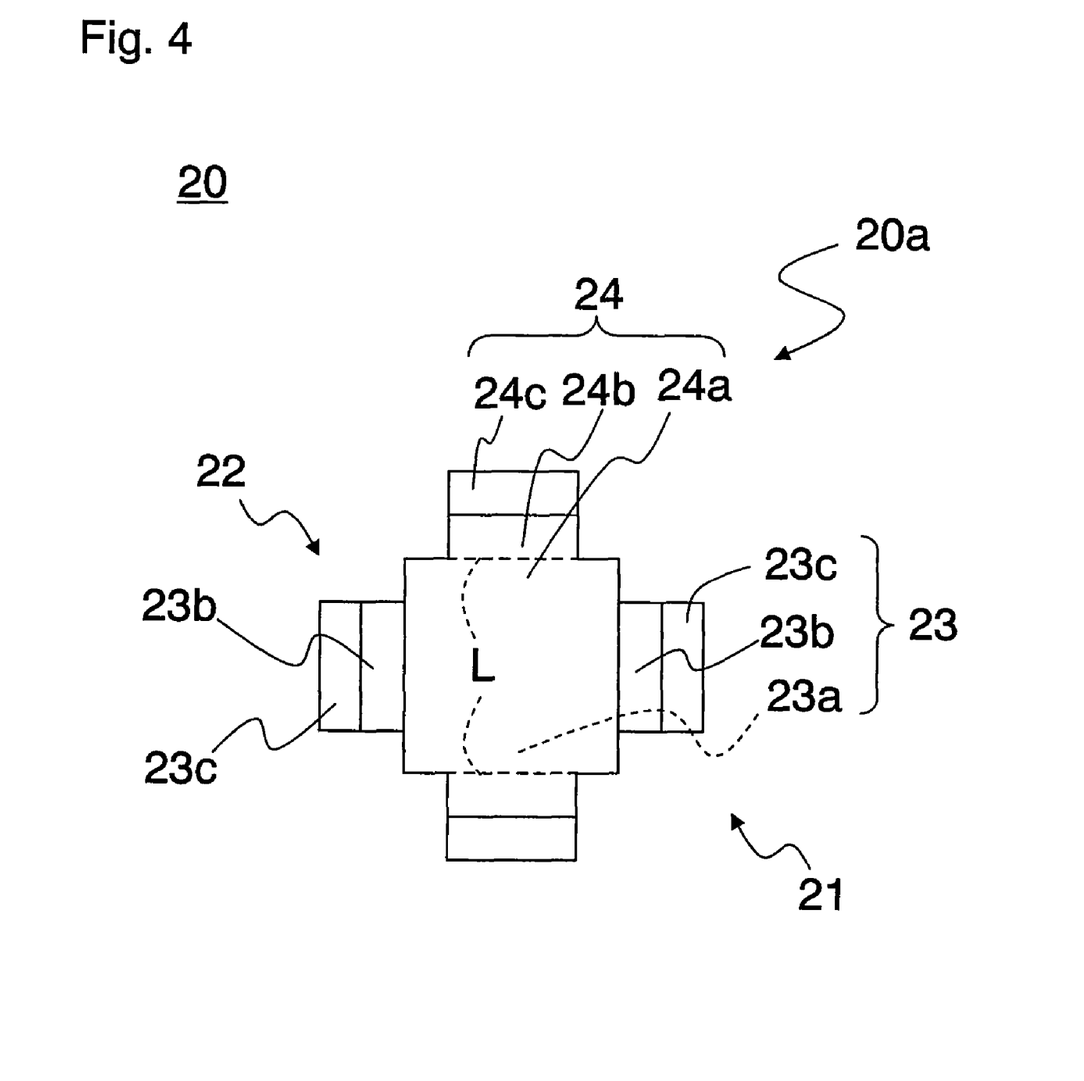
FIG. 4 is a top view schematically illustrating the configuration of a relevant part of a lithium ion secondary battery in another embodiment of the present invention.

FIG. 4 is a top view schematically illustrating the configuration of a relevant part (electrode assembly 20a) of a lithium ion secondary battery 20 in another embodiment of the present invention. FIG. 4 is a top view from above in a direction vertical to the horizontal plane, setting the electrode assembly 20a on the horizontal plane so as to bring the side of the positive electrode 23 is in contact with the horizontal plane. The lithium ion secondary battery 20 is similar to the lithium ion secondary battery 1, and illustration and descriptions of corresponding components are omitted. The lithium ion secondary battery 20 has the same configuration as that of the lithium ion secondary battery 1, except that an electrode assembly 20a is included instead of the electrode assembly 2.

The electrode assembly 20a is a flat-plate electrode assembly, in which the positive electrode 21, a separator (not shown), and the negative electrode 22 are stacked.

The positive electrode 21 includes a positive electrode current collector 23 and a positive electrode active material layer, which is not shown.

The positive electrode current collector 23 includes a current collector body 23a, a heat radiating portion 23b, and a lead portion 23c.

The current collector body 23a has the same configuration as that of the current collector body 10a, and has a substantially rectangular shape.

The heat radiating portion 23b is continuous with the current collector body 23a, and is provided so as to be substantially parallel to the surface of the electrode assembly 20a in the thickness direction thereof. The heat radiating portion 23b has the same configuration as that of the heat radiating portion 10b, except that the heat radiating portion 23b is formed so as to extend individually from two facing sides of the current collector body 23a toward the outside of the electrode assembly 20a. The two sides of the current collector body 23a are one of any sides of the current collector body 23a, and a side facing that side. With such a configuration, the heat radiation efficiency of the heat radiating portion 23b becomes equal to or even higher than the heat radiation efficiency of the heat radiating portion 10b.

The lead portion 23c is continuous with the heat radiating portion 23a, and is provided so as to be substantially parallel to the surface of the electrode assembly 20a in the thickness direction thereof. The lead portion 23b has the same configuration as that of the lead portion 10c, except that the lead portions 23b are formed so as to extend individually from the two sides in the periphery of the heat radiating portion 23b in directions opposite to each other toward the outside of the electrode assembly 20a. With such a configuration, the heat radiation effects of the heat radiating portion 23b can be made even higher.

The positive electrode active material layer has a configuration same as that of the positive electrode active material layer 11 in the lithium ion secondary battery 1.

The negative electrode 22 includes a negative electrode current collector 24 and a negative electrode active material layer, which is not shown.

The negative electrode current collector 24 includes a current collector body 24a, a heat radiating portion 24b, and a lead portion 24c and has the same shape as that of the positive electrode current collector 23. The current collector body 24a has the same configuration as that of the current collector body 12a, and has a substantially rectangular shape.

The heat radiating portion 24b is continuous with the current collector body 24a, and is provided so as to be substantially parallel to the surface of the electrode assembly 20a in the thickness direction thereof. The heat radiating portion 24b has the same configuration as that of the heat radiating portion 12b, except that the heat radiating portion 24b is formed so as to extend individually from two sides of the current collector body 24a toward the outside of the electrode assembly 20a. The two sides of the current collector body 24a are one of any sides of the current collector body 24a, and a side facing that side. With such a configuration, the heat radiation efficiency of the heat radiating portion 24b becomes equal to or even higher than the heat radiation efficiency of the heat radiating portion 12b.

The lead portion 24c is continuous with the heat radiating portion 24a, and is provided so as to be substantially parallel to the surface of the electrode assembly 20a in the thickness direction thereof. The lead portion 24b has the same configuration as that of the lead portion 10c, except that the lead portions 24c are formed so as to extend individually from the two sides in the periphery of the heat radiating portion 24b in directions opposite to each other toward the outside of the electrode assembly 20a. With such a configuration, the heat radiation effects of the heat radiating portion 24b can be made even higher.

The negative electrode active material layer has a configuration same as that of the negative electrode active material layer 13 in the lithium ion secondary battery 1.

As shown in FIG. 4, in the lithium ion secondary battery 20 as well, the positive electrode current collector 23 and the negative electrode current collector 24 are disposed so that the point of intersections of diagonal lines of their current collector bodies 23a and 24a coincide with each other in the thickness direction thereof. That is, the current collector bodies 23a and 24a are overlaid in the thickness direction, with the positive electrode active material layer, the separator, and the negative electrode active material layer interposed therebetween. Also, the positive electrode current collector 23 and the negative electrode current collector 24 are symmetrically disposed with the point of intersection of the diagonal lines of the current collector bodies 23a and 24a, so that plane of projections of the heat radiating portions 23b and 24b are not overlaid in the thickness direction thereof.

The lithium ion secondary battery 20 includes the electrode assembly 20a with the above-described heat radiating portions 23b and 24b, and therefore the heat radiation efficiency further improves, and the mechanical strength and durability improve.

A lithium ion secondary battery of the present invention can be used similarly to a conventional lithium ion secondary battery, and is particularly useful as a power source for portable electronic devices such as personal computers, mobile phones, portable devices, personal digital assistants (PDAs), portable game consoles, and camcorders. Additionally, expected use includes, for example, a secondary battery for supporting an electric motor in hybrid electric vehicles and fuel cell vehicles; a power source for electrically-powered tools, vacuum cleaners, robots; and a power supply for plug-in HEVs.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A lithium ion secondary battery including a flat-plate electrode assembly in which a positive electrode, a separator, and a negative electrode are stacked in the thickness direction of the flat-plate electrode assembly; and
   a non-aqueous electrolyte, wherein:
   the positive electrode and the negative electrode each include an active material layer capable of absorbing and desorbing lithium and a current collector,
   said current collector includes: a substantially rectangular current collector body on the surface of which the active material layer is formed, and said current collector body being present in the flat-plate electrode assembly; a heat radiating portion that extends from a portion or all of two or three adjacent sides of the current collector body toward the outside of the flat-plate electrode assembly; and a lead portion,
   the heat radiating portion has an L-shape or an angular U-shape, and extends outwardly from the flat-plate electrode assembly, a plane of projection of the heat radiating portion of the positive electrode current collector does not overlap with a plane of projection of the heat radiating portion of the negative electrode current collector, the lead portion is joined to or formed integrally with the heat radiating portion along a periphery of the heat radiating portion, the lead portion extends from the periphery of the heat radiating portion, the lead portion is drawn out to the outside of the lithium ion secondary battery, and the lead portion has an L-shape or an angular U-shape.

2. The lithium ion secondary battery in accordance with claim 1, wherein the heat radiating portion is formed as a single unit.

3. The lithium ion secondary battery in accordance with claim 1, wherein the ratio ($S/S_0$) of area S of the heat radiating portion relative to area $S_0$ of the current collector body is 0.03 to 1.5.

4. The lithium ion secondary battery in accordance with claim 1, wherein the ratio ($L/L_0$) of length L of a boundary between the current collector body and the heat radiating portion relative to peripheral length $L_0$ of the current collector body is 0.25 or more.

5. The lithium ion secondary battery in accordance with claim 1, wherein the negative electrode active material layer includes a negative electrode active material capable of forming an alloy with lithium, and capable of absorbing and desorbing lithium.

6. The lithium ion secondary battery in accordance with claim 5, wherein the negative electrode active material includes silicon or tin.

7. The lithium ion secondary battery in accordance with claim 5, wherein the negative electrode active material is at least one selected from the group consisting of silicon, silicon oxides, silicon nitrides, silicon carbide, silicon-containing alloys, silicon-containing compounds, tin, tin oxides, tin nitrides, tin-containing alloys, and tin-containing compounds.

* * * * *